US011935475B2

(12) United States Patent
Noh et al.

(10) Patent No.: US 11,935,475 B2
(45) Date of Patent: Mar. 19, 2024

(54) DISPLAY DEVICE, DRIVING CIRCUIT AND DISPLAY DRIVING METHOD

(71) Applicant: LG DISPLAY CO., LTD., Seoul (KR)

(72) Inventors: Junhwan Noh, Seoul (KR); SungBae An, Ulsan (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/973,886

(22) Filed: Oct. 26, 2022

(65) Prior Publication Data

US 2023/0154405 A1 May 18, 2023

(30) Foreign Application Priority Data

Nov. 16, 2021 (KR) ........................ 10-2021-0157176

(51) Int. Cl.
*G09G 3/3233* (2016.01)
*G09G 3/3275* (2016.01)

(52) U.S. Cl.
CPC ......... *G09G 3/3233* (2013.01); *G09G 3/3275* (2013.01); *G09G 2310/0262* (2013.01); *G09G 2310/027* (2013.01); *G09G 2310/08* (2013.01); *G09G 2320/0214* (2013.01); *G09G 2340/0435* (2013.01)

(58) Field of Classification Search
CPC ............... G09G 3/3233; G09G 3/3275; G09G 2310/0262; G09G 2310/027; G09G 2310/08; G09G 2320/0214; G09G 2340/0435
USPC .......................................................... 345/204
See application file for complete search history.

(56) References Cited

U.S. PATENT DOCUMENTS

2018/0166010 A1* 6/2018 Park ..................... G09G 3/3258
2019/0035322 A1* 1/2019 Kim ..................... G09G 3/3233
2020/0211471 A1* 7/2020 Park ..................... G09G 3/3275
2021/0049959 A1* 2/2021 Park ....................... G09G 3/325
2021/0056895 A1* 2/2021 Lee ...................... G09G 3/3233
2021/0201782 A1* 7/2021 Jang ..................... G09G 3/3233
2021/0201827 A1* 7/2021 Jang ..................... G09G 3/3291
2022/0076617 A1* 3/2022 Kim .......................... G09G 3/32
2022/0157263 A1* 5/2022 Moon .................. G09G 3/3291
2023/0079102 A1* 3/2023 Kim .................. H01L 21/76877 345/204
2023/0137564 A1* 5/2023 Lee ...................... G09G 3/3233 345/76

(Continued)

*Primary Examiner* — Tom V Sheng
(74) *Attorney, Agent, or Firm* — POLSINELLI PC

(57) ABSTRACT

A display device includes a display panel including a light emitting element, a driving transistor for providing a driving current to the light emitting element using a driving voltage, and a plurality of switching transistors for controlling the operation of the driving transistor; a gate driving circuit for supplying a plurality of scan signals to the display panel through a plurality of gate lines; an emission driving circuit for supplying a plurality of emission signals to the display panel through a plurality of emission signal lines; a data driving circuit for supplying a data voltage to the display panel; and a timing controller for controlling a leakage suppression voltage to be supplied to the driving transistor in a leakage suppression period after a bias voltage is supplied to the driving transistor in a low speed mode in which the display panel is driven at a lower driving frequency.

16 Claims, 13 Drawing Sheets

(56) References Cited

U.S. PATENT DOCUMENTS

2023/0143180 A1* 5/2023 Song .................... G09G 3/3233
345/691
2023/0145805 A1* 5/2023 Kim ..................... G09G 3/3291
345/691

* cited by examiner

DISPLAY DEVICE, DRIVING CIRCUIT AND DISPLAY DRIVING METHOD

CROSS-REFERENCE TO RELATED APPLICATION

This application claims priority from Korean Patent Applications No. 10-2021-0157176, filed on Nov. 16, 2021, which are hereby incorporated by reference in its entirety.

BACKGROUND

Field of the Disclosure

The present disclosure relates to a display device, a driving circuit and a display driving method capable of capable of reducing defects of image quality by reducing leakage current generated in the process of operating at a lower driving frequency.

Description of the Background

With the development of the information society, there has been an increasing demand for a variety of types of image display devices. In this regard, a range of display devices, such as liquid crystal display device, electroluminescence display device, or quantum dot light emitting display device have recently come into widespread use.

Among such display devices, the organic light emitting display devices have superior properties, such as rapid response speeds, high contrast ratios, high emissive efficiency, high luminance, and wide viewing angles, since self-emissive light emitting diodes are used.

Such an organic light emitting display device may include organic light emitting diodes disposed in a plurality of subpixels aligned in a display panel, and may control the organic light emitting diodes to emit light by controlling a voltage flowing through the organic light emitting diodes, so as to display an image while controlling luminance of the subpixels.

In this case, the image data supplied to the display device may be a still image or a moving image with variable speed, and even in the case of a moving image, may correspond to various types of images such as sports images, movies, and game images.

Also, the display device may be switched to various driving modes according to a user's input or operation state.

On the other hand, the display device may change the driving frequency according to a type of image data or a driving mode, but a degradation of the image quality such as black glare may be generated due to the leakage current flowing in the process of operating at a lower driving frequency.

SUMMARY

Accordingly, the present disclosure is to provide a display device, a driving circuit and a display driving method capable of reducing defects of image quality occurring in the process of operating at a lower driving frequency.

The present disclosure provides a display device, a driving circuit and a display driving method capable of reducing defects of image quality such as flicker by stably maintaining a driving transistor in an operating period at a lower driving frequency.

The present disclosure also provides a display device, a driving circuit and a display driving method capable of reducing defects of image quality by controlling the levels of an initialization voltage, a bias voltage, and a leakage suppression voltage supplied to a driving transistor in the operating period at the lower driving frequency.

The present disclosure also provides a display device, a driving circuit and a display driving method capable of improving image quality due to leakage current by supplying a leakage suppression voltage with a different level from the bias voltage to the driving transistor in a emission period in the process of operating at a lower driving frequency.

The present disclosure provides a display device, a driving circuit and a display driving method capable of effectively improving image quality due to leakage current by controlling the level of the leakage suppression voltage supplied to the driving transistor in the emission period according to a grayscale of the data voltage in the process of operating at the lower driving frequency.

The problems to be solved according to the present disclosure to be described below are not limited to the problems mentioned above, and other problems not mentioned will be clearly understood by those skilled in the art from the following description.

In an aspect of the present disclosure, a display device includes a display panel including a light emitting element, a driving transistor for providing a driving current to the light emitting element using a driving voltage, and a plurality of switching transistors for controlling the operation of the driving transistor; a gate driving circuit for supplying a plurality of scan signals to the display panel through a plurality of gate lines; an emission driving circuit for supplying a plurality of emission signals to the display panel through a plurality of emission signal lines; a data driving circuit for supplying a data voltage to the display panel; and a timing controller for controlling a leakage suppression voltage to be supplied to the driving transistor in a leakage suppression period after a bias voltage is supplied to the driving transistor in a low speed mode in which the display panel is driven at a lower driving frequency.

In the display device of the present disclosure, the low speed mode includes a refresh frame in which the data voltage for driving the light emitting element is supplied; and a skip frame in which the data voltage is not supplied.

In another aspect of the present disclosure, a display device includes a plurality of switching transistors that include a first switching transistor to which a first scan signal is supplied to a gate electrode, a drain electrode is connected to a gate electrode of the driving transistor and a storage capacitor, and a source electrode is connected to a source electrode of the driving transistor; a second switching transistor to which a second scan signal is supplied to a gate electrode, the data voltage is supplied to a drain electrode, and a source electrode is connected to a drain electrode of the driving transistor; a third switching transistor to which the emission signal is supplied to the gate electrode, the driving voltage is supplied to the drain electrode, and the source electrode is connected to the drain electrode of the driving transistor; a fourth switching transistor to which the emission signal is supplied to a gate electrode, the driving voltage is supplied to a drain electrode, and a source electrode is connected to an anode electrode of the light emitting element; a fifth switching transistor to which a third scan signal is supplied to a gate electrode, a stabilization voltage is supplied to a drain electrode, and a source electrode is connected to the source electrode of the driving transistor; and a sixth switching transistor to which a fourth scan signal is supplied to a gate electrode, a reset voltage is supplied to a drain electrode, and a source electrode is connected to the anode electrode of the light emitting element.

In the display device of the present disclosure, the stabilization voltage includes an initialization voltage for initializing the driving transistor; the bias voltage; and the leakage suppression voltage.

In the display device of the present disclosure, the initialization voltage is supplied in the refresh frame, the bias voltage is supplied in the refresh frame or in the skip frame, and the leakage suppression voltage is supplied in the leakage suppression period including an emission period in which the light emitting element emits light.

In the display device of the present disclosure, the initialization voltage has a negative level, the bias voltage has a first positive level, and the leakage suppression voltage has a second positive level lower than the first positive level.

The display device of the present disclosure further includes a memory for storing the image data supplied to the display panel; wherein the timing controller controls levels of the leakage suppression voltage and the bias voltage depending on a grayscale of the image data supplied from the memory in the refresh frame.

In another aspect of the present disclosure, a driving circuit of a display panel includes a light emitting element, a driving transistor for providing a driving current to the light emitting element using a driving voltage, and a plurality of switching transistors for controlling the operation of the driving transistor according to an aspect of present disclosure, comprising: a shift register for generating a first output signal through a first node and a second output signal through a second node depending on a stabilization start pulse; a buffer circuit for transmitting an initialization voltage to a first output terminal, and a bias voltage and a leakage suppression voltage to a second output terminal depending on the first output signal and the second output signal; and a switching circuit for supplying the bias voltage or the leakage suppression voltage to a source electrode of the driving transistor depending on a selection signal.

In the driving circuit of the present disclosure, the switching circuit includes a first control transistor and a second control transistor each having a drain electrode connected to the second output terminal; and an inverter which receives the selection signal, an output terminal is connected to a gate electrode of the first control transistor, and an input terminal is connected to a gate electrode of the second control transistor.

In the driving circuit of the present disclosure, the initialization voltage is supplied in a refresh frame to which a data voltage for driving the light emitting element is applied in a low speed mode driven at a lower driving frequency, the bias voltage is supplied in the refresh frame, or a skip frame in which the data voltage is not supplied, in the low speed mode driven at the lower driving frequency, and the leakage suppression voltage is supplied in a leakage suppression period including an emission period in which the light emitting element emits light.

In the driving circuit of the present disclosure, levels of the leakage suppression voltage and the bias voltage are determined depending on a grayscale of the image data supplied in the refresh frame.

In the driving circuit of the present disclosure, the initialization voltage has a negative level, the bias voltage has a first positive level, and the leakage suppression voltage has a second positive level lower than the first positive level.

In a further aspect of the present disclosure, a display driving method of a display panel including a light emitting element, a driving transistor for providing a driving current to the light emitting element using a driving voltage, and a plurality of switching transistors for controlling the operation of the driving transistor according to an aspect of present disclosure, comprising: switching from a first mode driven at a higher driving frequency to a second mode driven at a lower driving frequency; supplying an initialization voltage with a negative level to a driving transistor in an initialization period; supplying a bias voltage with a first positive level to the driving transistor in a bias period; and supplying a leakage suppression voltage with a second positive level different from the first positive level to the driving transistor in a leakage suppression period including an emission period.

In the display driving method of the present disclosure, the low speed mode includes a refresh frame in which the data voltage for driving the light emitting element is supplied; and a skip frame in which the data voltage is not supplied.

In the display driving method of the present disclosure, the initialization voltage is supplied in the refresh frame, the bias voltage is supplied in the refresh frame or in the skip frame, and the leakage suppression voltage is supplied in the leakage suppression period including an emission period in which the light emitting element emits light.

In the display driving method of present disclosure, levels of the leakage suppression voltage and the bias voltage are determined depending on a grayscale of the image data supplied in the refresh frame.

In the display driving method of present disclosure, the second positive level is lower than the first positive level.

In the present disclosure, it is possible to provide a display device, a driving circuit and a display driving method capable of reducing defects of image quality occurring in the process of operating at a lower driving frequency.

In the present disclosure, a display device, a driving circuit and a display driving method that are capable of reducing defects of image quality such as flicker by stably maintaining a driving transistor in an operating period at a lower driving frequency.

In the present disclosure, a display device, a driving circuit and a display driving method that are capable of reducing defects of image quality by controlling the levels of an initialization voltage, a bias voltage, and a leakage suppression voltage supplied to a driving transistor in the operating period at the lower driving frequency.

In the present disclosure, a display device, a driving circuit and a display driving method that are capable of improving image quality due to leakage current by supplying a leakage suppression voltage with a different level from the bias voltage to the driving transistor in a emission period in the process of operating at a lower driving frequency.

In the present disclosure, a display device, a driving circuit and a display driving method that are capable of effectively improving image quality due to leakage current by controlling the level of the leakage suppression voltage supplied to the driving transistor in the emission period according to a grayscale of the data voltage in the process of operating at the lower driving frequency.

The effects of the aspects disclosed in the present disclosure are not limited to the above mentioned effects. In addition, the aspects disclosed in the present disclosure may cause another effect not mentioned above, which will be clearly understood by those skilled in the art from the following description.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
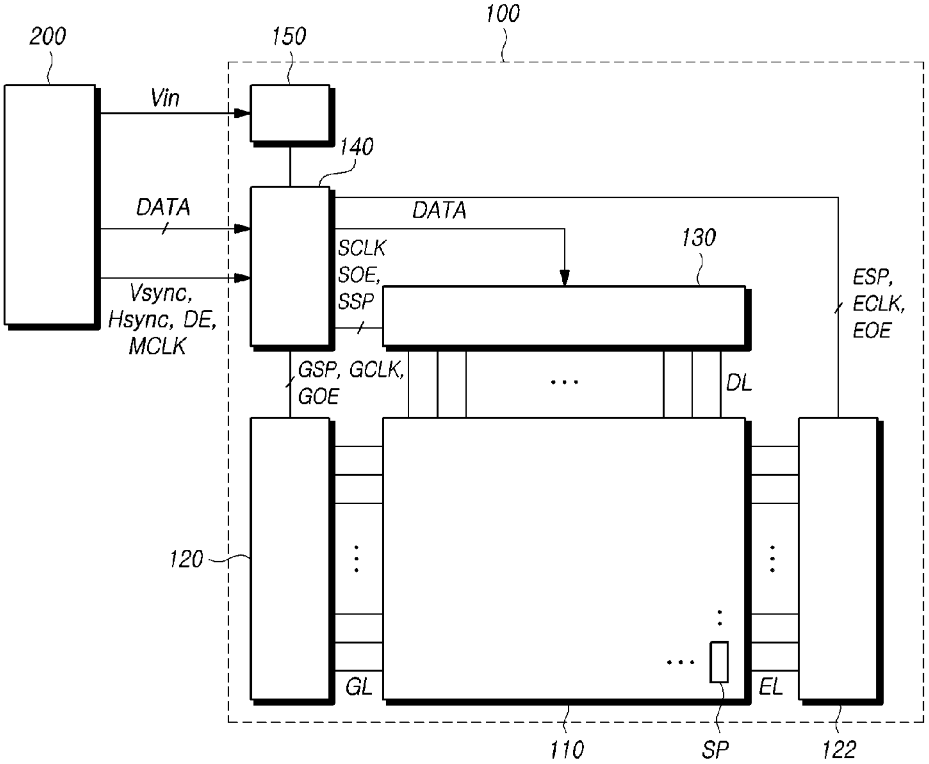
FIG. 1 illustrates a schematic diagram of a display device according to the present disclosure.

The advantages and features of the present disclosure and methods of the realization thereof will be apparent with reference to the accompanying drawings and detailed descriptions of the aspects. The present disclosure should not be construed as being limited to the aspects set forth herein and may be embodied in a variety of different forms. Rather, these aspects are provided so that the present disclosure will be thorough and complete, and will fully convey the scope of the present disclosure to those having ordinary knowledge in the technical field. The scope of the present disclosure shall be defined by the appended claims.

The shapes, sizes, ratios, angles, numbers, and the like, inscribed in the drawings to illustrate exemplary aspects are illustrative only, and the present disclosure is not limited to the aspects illustrated in the drawings. Throughout this document, the same reference numerals and symbols will be used to designate the same or like components. In the following description of the present disclosure, detailed descriptions of known functions and components incorporated into the present disclosure will be omitted in the situation in which the subject matter of the present disclosure may be rendered unclear thereby. It will be understood that the terms “comprise”, “include”, “have”, and any variations thereof used herein are intended to cover non-exclusive inclusions unless explicitly described to the contrary. Descriptions of components in the singular form used herein are intended to include descriptions of components in the plural form, unless explicitly described to the contrary.

In the analysis of a component, it shall be understood that an error range is included therein, even in the situation in which there is no explicit description thereof.

When spatially relative terms, such as “on”, “above”, “under”, “below”, and “on a side of”, are used herein for descriptions of relationships between one element or component and another element or component, one or more intervening elements or components may be present between the one and other elements or components, unless a term, such as “directly”, is used.

When temporally relative terms, such as “after”, “subsequent”, “following”, and “before” are used to define a temporal relationship, a non-continuous case may be included unless the term “immediately” or “directly” is used.

In descriptions of signal transmission, such as “a signal is sent from node A to node B”, a signal may be sent from node A to node B via another node unless the term “immediately” or “directly” is used.

In addition, terms, such as “first” and “second” may be used herein to describe a variety of components. It should be understood, however, that these components are not limited by these terms. These terms are merely used to discriminate one element or component from other elements or components. Thus, a first component referred to as first hereinafter may be a second component within the spirit of the present disclosure.

The features of exemplary aspects of the present disclosure may be partially or entirely coupled or combined with each other and may work in concert with each other or may operate in a variety of technical methods. In addition, respective exemplary aspects may be carried out independently or may be associated with and carried out in concert with other aspects.

Hereinafter, a variety of aspects will be described in detail with reference to the accompanying drawings.

FIG. 1 illustrates a schematic diagram of a display device according to aspects of the present disclosure.

Referring to FIG. 1, the display device 100 according to aspects of the present disclosure may include a display panel 110 connected to a plurality of gate lines GL and a plurality of data lines DL in which a plurality of subpixels SP are arranged in rows and columns, a gate driving circuit 120 for supplying scan signals to the plurality of gate lines GL, an emission driving circuit 122 for driving a plurality of emission signal lines EL, a data driving circuit 130 for supplying data voltages to the plurality of data lines DL, a timing controller 140 for controlling the gate driving circuit 120 and the data driving circuit 130, and a power management circuit 150.

The display panel 110 displays an image based on the scan signals supplied from the gate driving circuit 120 through the plurality of gate lines GL and the data voltages supplied from the data driving circuit 130 through the plurality of data lines DL.

In the case of a liquid crystal display, the display panel 110 includes a liquid crystal layer formed between two substrates, and TN (Twisted Nematic) mode, VA (Vertical Alignment) mode, IPS (In Plane Switching) mode, FFS (Fringe Field Switching) mode or any known mode may be operated. In the case of an organic light emitting display device, the display panel 110 may be implemented in a top emission method, a bottom emission method, or a dual emission method.

In the display panel 110, a plurality of pixels may be disposed in a matrix form. Each pixel may be composed of subpixels SP of different colors, for example, a white subpixel, a red subpixel, a green subpixel, and a blue subpixel. Each subpixel SP may be defined by the plurality of the data lines DL and the plurality of the gate lines GL.

A subpixel SP may include a thin film transistor (TFT) arranged in a region where a data line DL and a gate line GL intersect, a light emitting element such as an light emitting diode which is emitted according to the data voltage, and a storage capacitor for maintaining the data voltage by being electrically connected to the light emitting element.

For example, when the display device 100 having a resolution of 2,160×3,840 includes four subpixels SP of white W, red R, green G, and blue B, 3,840×4=15,360 data lines DL may be provided by 2,160 gate lines GL and 3,840 data lines DL respectively connected to 4 subpixels WRGB. Each of the plurality of subpixels SP may be disposed in areas in which the plurality of gate lines GL overlap the plurality of data lines DL.

The gate driving circuit 120 is controlled by the timing controller 140, and controls the driving timing of the plurality of subpixels SP by sequentially supplying the scan signals to the plurality of gate lines GL disposed in the display panel 110.

In the display device 100 having a resolution of 2,160×3,840, an operation of sequentially supplying the scan signals to the 2,160 gate lines GL from the first gate line GL1 to the 2,160th gate line GL2160 may be referred to as 2,160-phase driving operation. Otherwise, an operation of sequentially supplying the scan signals to every four gate lines GL, as in a case in which the scan signals are supplied sequentially from first gate line GL1 to fourth gate lines GL4, and then are supplied sequentially from fifth gate line GL5 to eighth gate line GL8, may be referred to as 4-phase driving operation. As described above, an operation in which the scan signals are supplied sequentially to every N number of gate lines may be referred as N-phase driving operation.

The gate driving circuit 120 may include one or more gate driving integrated circuits (GDIC), which may be disposed on one side or both sides of the display panel 110 depending on the driving method. Alternatively, the gate driving circuit 120 may be implemented in a gate-in-panel (GIP) structure embedded in a bezel area of the display panel 110.

Here, it has illustrated a case where the gate driving circuit 120 is located on the left side of the display panel 110 and the emission driving circuit 122 is located on the right side of the display panel 110, and the gate driving circuit 120 and the emission driving circuit 122 may be disposed at the same position.

The emission driving circuit 122 generates an emission signal EM and supplies it to the display panel 110 through the emission signal line EL depending on a control of the timing controller 140.

The emission driving circuit 122 may sequentially supply the emission signal EM through the emission signal line EL by shifting the emission signal EM using a shift register. At this time, the emission driving circuit 122 may drive the display panel 110 at a certain duty ratio, for example 50% duty ratio, by repeatedly toggling the emission signal EM during the image driving period depending on the control of the timing controller 140.

In this case, the emission driving circuit 122 may include one or more emission control circuits ECC, and may be located on only one side of the display panel 110 or both sides according to a driving mode. The emission driving circuit 122 may be directly formed on the substrate of the display panel 110 together with the gate driving circuit 120 by a GIP (Gate In Panel) process.

One frame period may include a writing period in which a data voltage is supplied and written to each subpixel SP, and an emission period in which the subpixel SP emits light at a predetermined duty ratio according to the emission signal EM after the writing period. In general, the emission signal EM emits the subpixel SP at a duty ratio of 50% or less during the emission period. Since the writing period is only approximately one horizontal period (1H), most of one frame period corresponds to the emission period.

The subpixel SP charges the storage capacitor with a data voltage during the writing period, and the subpixel SP repeatedly turns on and off according to the emission signal EM. That is, the subpixel SP repeatedly turns on and off within one frame period to emit light with a duty ratio of 50% or less.

As described above, the subpixel SP may display data with a same luminance during one frame period with a duty ratio of 50% or less without receiving an additional data voltage during the emission period after the writing period by emitting light after being turned off due to the voltage charged in the storage capacitor.

The data driving circuit 130 receives digital image data DATA from the timing controller 140, and converts the received digital image data DATA into an analog data voltage. Then, the data driving circuit 130 supplies the analog data voltage to each of the data lines DL at time which the scan signal is supplied through the gate line GL, so that each of the subpixels SP connected to the data lines DL emits light with a corresponding luminance in response to a timing at which the emission signal EM is supplied.

Likewise, the data driving circuit 130 may include one or more source driving integrated circuits (SDIC). Each of the source driving integrated circuits SDIC may be connected to a bonding pad of the display panel 110 by a tape automated bonding (TAB) or a chip on glass (COG), or may be directly mounted on the display panel 110.

In some cases, each of the source driving integrated circuits (SDIC) may be integrated with the display panel 110. In addition, each of the source driving integrated circuits (SDIC) may be implemented with a chip on film (COF) structure. In this case, the source driving integrated circuit SDIC may be mounted on circuit film to be electrically connected to the data lines DL in the display panel 110 via the circuit film.

The timing controller 140 supplies various control signals to the gate driving circuit 120, the emission driving circuit 122 and the data driving circuit 130, and controls the operations of the gate driving circuit 120, the emission driving circuit 122 and the data driving circuit 130. That is, the timing controller 140 controls the output of the scan signals from the gate driving circuit 120, the output of the emission signals EM from the emission driving circuit 122 in response to a time realized by respective frames, and on the other hand, transmits the image data DATA from an external source to the data driving circuit 130.

Here, the timing controller 140 receives various timing signals, including a vertical synchronization signal Vsync, a horizontal synchronization signal Hsync, a data enable signal DE, and a main clock MCLK, from an external host system 200.

The host system 200 may be any one of a TV (Television) system, a set-top box, a navigation system, a personal computer (PC), a home theater system, a mobile device, and a wearable device.

Accordingly, the timing controller 140 generates control signals using the various timing signals received from the external source, and supplies the control signals to the gate driving circuit 120, the emission driving circuit 122 and the data driving circuit 130.

For example, the timing controller 140 generates various gate control signals, including a gate start pulse GSP, a gate clock GCLK, and a gate output enable signal GOE, to control the gate driving circuit 120. Here, the gate start pulse GSP is used to control the start timing of one or more gate driving integrated circuits GDIC of the gate driving circuit 120. In addition, the gate clock GCLK is a clock signal commonly supplied to the one or more gate driving integrated circuits GDIC for controlling the shift timing of the scan signals. The gate output enable signal GOE designates timing information of the one or more gate driving integrated circuits GDIC.

Also, the timing controller 140 generates various emission signals including an emission start pulse ESP, an emission clock ECLK, and an emission output enable signal EOE in order to control the emission driving circuit 122. Here, the emission start pulse ESP controls the start timing at which one or more emission control circuits ECC constituting the emission driving circuit 122 are operated. In addition, the emission clock ECLK is a clock signal commonly supplied to one or more emission control circuits ECC, and controls shift timing of the emission signal EM. In addition, the emission output enable signal EOE designates timing information of one or more emission control circuits ECC.

In addition, the timing controller 140 generates various data control signals, including a source start pulse SSP, a source sampling clock SSC, and a source output enable signal SOE, to control the data driving circuit 130. Here, the source start pulse SSP is used to control the start timing for the data sampling of one or more source driving integrated circuits SDIC of the data driving circuit 130. The source sampling clock SSC is a clock signal for controlling a timing of data sampling in each of the source driving integrated circuits SDIC. The source output enable signal SOE controls the output timing of the data driving circuit 130.

The display device 100 may further include a power management circuit 150 for supplying or controlling various voltage or current to the display panel 110, the gate driving circuit 120, the emission driving circuit 122 and the data driving circuit 130.

The power management circuit 150 generates a necessary power to drive the display panel 110, the gate driving circuit 120, the emission driving circuit 122 and the data driving circuit 130 by controlling a DC input voltage Vin supplied from the host system 200.

The subpixel SP is positioned at a point where the gate line GL and the data line DL intersect and a light emitting element may be disposed in each of the subpixels SP. For example, the organic light emitting display device may include a light emitting element, such as a light emitting diode in each of the subpixels SP, and may display an image by controlling current flowing through the light emitting elements in response to the data voltage.

The display device 100 may be various types of devices such as a liquid crystal display, an organic light emitting display, and a plasma display panel.

Figure 2:
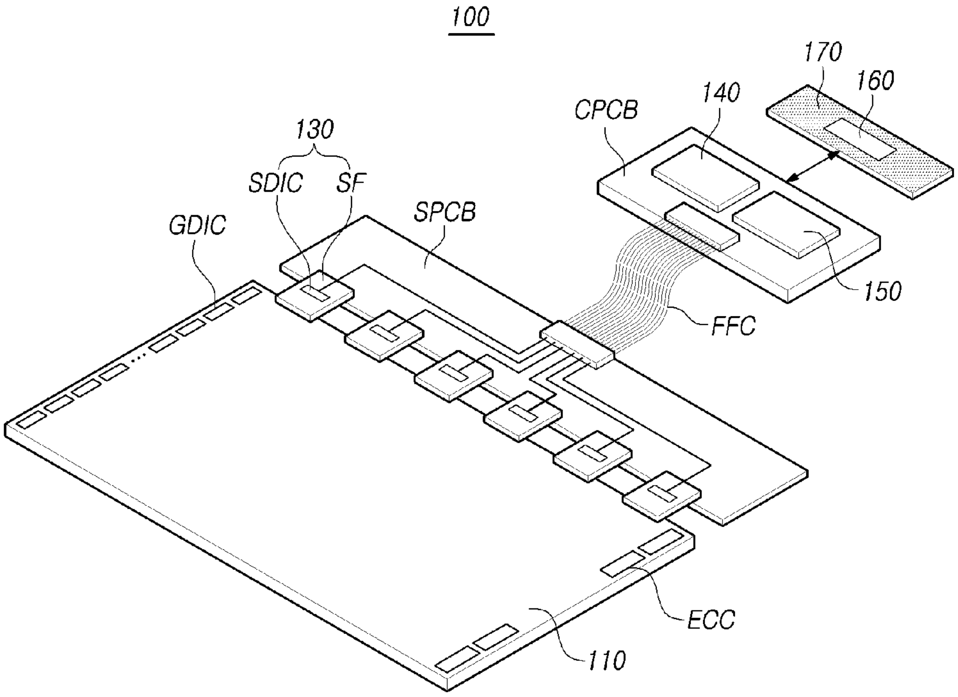
FIG. 2 illustrates a system diagram of the display device according to the present disclosure.

FIG. 2 illustrates a system diagram of the display device according to aspects of the present disclosure.

As an example, FIG. 2 illustrates that each of the source driving integrated circuits SDIC of the data driving circuit 130 in the display device 100 according to aspects of the present disclosure is implemented with a COF type among various structures among various structures (e.g., a TAB, a COG, and a COF), and the gate driving circuit 120 and the emission driving circuit 122 are implemented with a GIP type among various structures such as a TAB, a COG, a COF, and a GIP.

When the gate driving circuit 120 is implemented in a GIP type, the plurality of gate driving integrated circuits GDIC of the gate driving circuit 120 may be directly formed in a bezel area of the display panel 110. At this time, the gate driving integrated circuits GDIC may receive various signals (e.g., clock signal, gate high signal, gate low signal, etc.) necessary for generating the scan signal through the signal lines related to gate driving operation arranged in the bezel area.

In addition, when the emission driving circuit 122 is implemented in a GIP form, the plurality of emission control circuits ECC included in the emission driving circuit 122 may be directly formed in the bezel area of the display panel 110. In this case, the emission control circuit ECC may receive various signals (e.g., a clock signal, an emission driving signal) necessary for generating the emission signal EM through a signal line related to light emitting operation disposed in the bezel area.

Likewise, the data driving circuit 130 may include one or more source driving integrated circuits SDIC, which may be mounted on a source film SF, respectively. One portion of the source film SF may be electrically connected to the display panel 110. In addition, electrical lines may be disposed on the source films SF to electrically connect the source driving integrated circuits SDIC and the display panel 110.

The display device 100 may include at least one source printed circuit board SPCB in order to connect the plurality of source driving integrated circuits SDIC to other devices by electrical circuit, and a control printed circuit board CPCB in order to mount various control components and electric elements.

The other portion of the source film SF, on which the source driving integrated circuit SDIC is mounted, may be connected to the at least one source printed circuit board SPCB. That is, one portion of source film SF, on which the source driving integrated circuit SDIC is mounted, may be electrically connected to the display panel 110, and the other portion of the source film SF may be electrically connected to the source printed circuit board SPCB.

The timing controller 140 and a power management circuit 150 may be mounted on the control printed circuit board CPCB. The timing controller 140 may control the operations of the data driving circuit 130 and the gate driving circuit 120. The power management integrated circuit 150 may supply a driving voltage and a driving current, or control a voltage and a current for the display panel 110, the data driving circuit 130, the gate driving circuit 120 and the emission driving circuit 122.

At least one source printed circuit board SPCB and the control printed circuit board CPCB may have circuitry connection by at least one connecting member. The connecting member may be, for example, a flexible printed circuit FPC, a flexible flat cable FFC, or the like. At least one source printed circuit board SPCB and the control printed circuit board CPCB may be integrated into a single printed circuit board.

The display device 100 may further include a set board 170 electrically connected to the control printed circuit board CPCB. The set board 170 may also be referred to as a power board. A main power management circuit (M-PMC) 160 managing overall power of the display device 100 may be located on the set board 170. The main power management circuit 160 may be coupled to the power management integrated circuit 150.

In the display device 100 having the above described configuration, a driving voltage is generated by the set board 170 to be supplied to the power management integrated circuit 150. The power management integrated circuit 150 supplies the driving voltage, which is required for a display driving operation or a sensing operation of the characteristic value, to the source printed circuit board SPCB through the flexible printed circuit FPC or the flexible flat cable FFC. The driving voltage supplied to the source printed circuit board SPCB, is transmitted to emit or sense a specific subpixel SP in the display panel 110 via the source driving integrated circuits SDIC.

Each of the subpixels SP arranged in the display panel 110 of the display device 100 may include a light emitting element and circuit elements, such as a driving transistor to drive it.

The type and number of the circuit elements constituting each of the subpixels SP may be variously determined depending on the function, the design, or the like.

Figure 3:
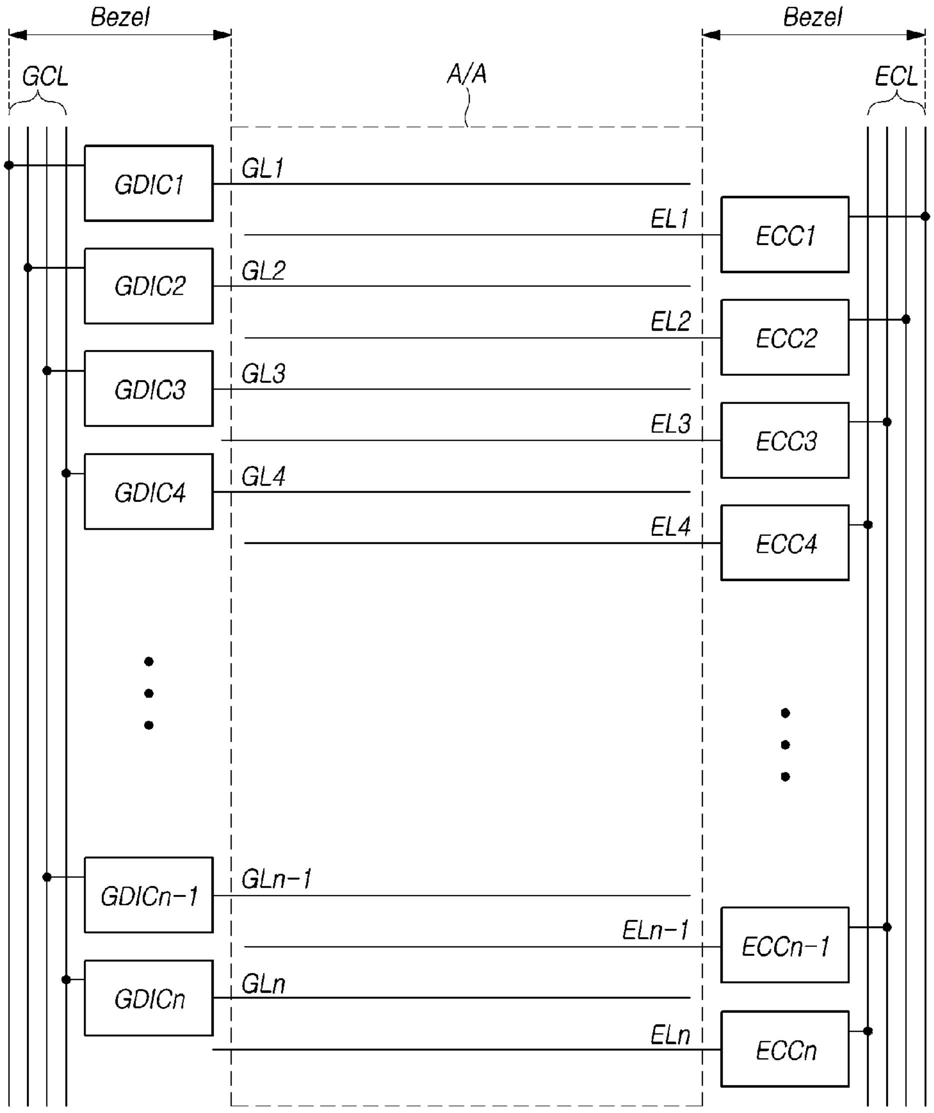
FIG. 3 illustrates a diagram of a display panel in which a gate driving circuit and a emission driving circuit are implemented in a GIP type in the display device according to the present disclosure.

FIG. 3 illustrates a diagram of a display panel in which a gate driving circuit and an emission driving circuit are implemented in a GIP type in the display device according to an aspect of the present disclosure.

Referring to FIG. 3, the display device 100 according to an aspect of the present disclosure may include n gate lines GL1-GLn (n being a natural number) and n emission signal lines EL1-ELn (n being a natural number) in an active area A/A for displaying an image on the display panel 110.

Here, the active area A/A is an area where a plurality of subpixels SP, for example, a white subpixel, a red subpixel, a green subpixel, and a blue subpixel for emitting light of a corresponding color are arranged and image is displayed. In addition, a plurality of dummy pixels that do not emit light because the scan signal SCAN or the data voltage Vdata are not supplied to some positions of the active area A/A but have a load similar to that of the subpixel SP may be arranged.

In the aspects of the present disclosure, the active area A/A may include a plurality of subpixel areas emitting light of a corresponding color and an area in which dummy pixels that do not emitting light are disposed. Alternatively, a plurality of subpixel areas emitting light of a corresponding color and an area in which dummy pixels that do not emit light are disposed may be referred to as a pixel array.

The gate driving circuit 120 may be disposed in a bezel area Bezel in which no pixel is formed at one side of the active area A/A, and may include n gate driving integrated circuits GDIC1-GDICn corresponding to the n gate lines GL1-GLn.

Accordingly, the n gate driving integrated circuit GDIC1-GDICn may supply the scan signals SCAN to the n gate lines GL1-GLn.

In addition, the emission driving circuit 122 may be disposed in a bezel area Bezel in which no pixel is formed at the other side of the active area A/A, and may include n emission control circuit ECC1-ECCn corresponding to the n emission signal lines EL1-ELn.

Accordingly, then emission control circuit ECC1-ECCn may supply the emission signals EM to the n emission signal lines EL1-ELn.

As described above, when the gate driving circuit 120 and the emission driving circuit 122 are implemented in a GIP type, there is no need to manufacture a separate integrated circuit having a gate driving function and bond it to the display panel 110. As a result, it is possible to reduce the number of integrated circuits and omit the connecting process of the integrated circuit to the display panel 110. In addition, the size of the bezel area for bonding the integrated circuit in the display panel 110 may be reduced.

Alternatively, then gate driving integrated circuits GDIC1-GDICn and n emission control circuits ECC1-ECCn may be disposed together only on one side of the bezel area Bezel.

A plurality of clock line CL in order to supply gate clocks GCLK required for generating and supplying the scan signals SCAN to the gate driving circuit 120 may be disposed in the bezel area Bezel in which no pixel is formed at one side of the active area A/A.

In addition, a plurality of emission clock line ECL in order to supply emission clocks ECLK required for generating and supplying the emission signals EM to the emission driving circuit 122 may be disposed in the bezel area Bezel in which no pixel is formed at the other side of the active area A/A.

Figure 4:
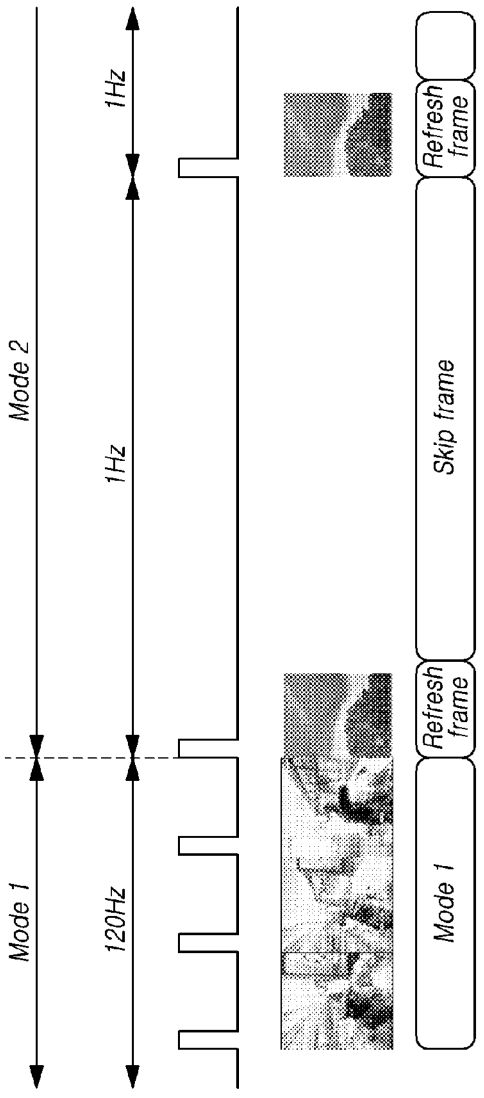
FIG. 4 illustrates a schematic diagram of driving modes based on frequency changes in a display device according to the present disclosure.

FIG. 4 illustrates a schematic diagram of driving modes based on frequency changes in a display device according to an aspect of the present disclosure.

Referring to FIG. 4, the display device 100 according to an aspect of the present disclosure may include a first mode Mode1 in which moving image data are displayed at a high speed first frequency and a second mode Mode2 in which still image data or low speed image data are displayed at a low speed second frequency.

For example, in the first mode Mode1, moving image data may be displayed on the display panel 110 at a frequency of 120 Hz corresponding to the first frequency. While the display device 100 is operated in the first mode Mode1, the subpixels SP of the display panel 110 display moving image data transmitted from the timing controller 140 for every 120 frame periods.

As described above, a period in which image data are continuously displayed on the display panel 110 at a higher driving frequency may be referred to as a refresh frame. For example, when the driving frequency is 120 Hz, all 120 frames for 1 second in the first mode Mode1 will be refresh frames in which image data are displayed.

Meanwhile, when the display device 100 is operated in the second mode Mode2 in which still image data or low speed image data are displayed, the display device 100 may display a designated image data in an initial period of the second mode Mode2 on the display panel 110, and may not display the image data on the display panel 110 for the remaining period.

For example, when entering the second mode Mode2, the display device 100 may change the driving frequency from the first frequency of 120 Hz to the second frequency of 1 Hz. At this time, the image data displayed in the last period of the first mode Mode1 may be displayed on the display panel 110 in the second mode Mode2 changed to a frequency of 1 Hz.

For example, in the second mode Mode2 driven at 1 Hz, the display device 100 may display the image data displayed in the last frame of the first mode Model on the display panel 110 once, and may not display the image data during the remaining time.

In this case, the subpixel SP may display the image data once in the second mode Mode2, but may maintain the voltage stored in the storage capacitor Cst for the remaining time.

As described above, a period in which the voltage stored in the storage capacitor Cst is maintained without transmitting image data to the display panel 110 may be referred to as a skip frame. For example, when the driving frequency is 120 Hz, the first frame of the second mode Mode2 will be a refresh frame in which image data are displayed, and the remaining frames are skip frames in which image data are not transmitted.

As described above, power consumption may be reduced by not transmitting image data DATA for a certain period (skip frame) in the second mode Mode2 driven at low speed frequency.

Figure 5:
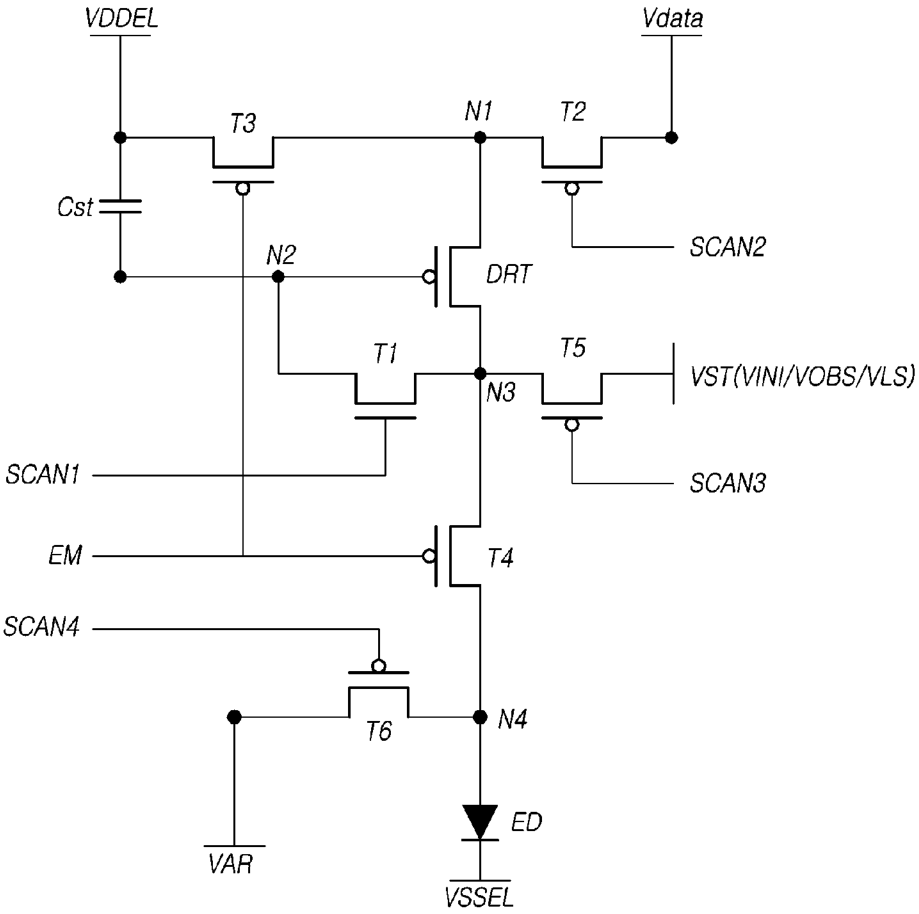
FIG. 5 illustrates a diagram of a subpixel circuit of the display device according to the present disclosure.

FIG. 5 illustrates a diagram of a subpixel circuit of the display device according to an aspect of the present disclosure.

Referring to FIG. 5, a subpixel SP of the display device 100 according to an aspect of the present disclosure includes first to sixth switching transistors T1-T6, a driving transistor DRT, a storage capacitor Cst and a light emitting element ED.

Herein, it is assumed that the light emitting element ED emits light by the nth emission signal EM as the nth subpixel SP.

Here, the light emitting element ED may be, for example, a self-emissive element capable of emitting light by itself, such as an organic light emitting diode OLED.

In the subpixel SP according to an aspect of the present disclosure, the second to sixth switching transistors T2-T6, and the driving transistor DRT may be P-type transistors. Also, the first switching transistor T1 may be N-type transistor.

The P-type transistor is relatively more reliable than the N-type transistor. The P-type transistor has an advantage that the current flowing through the light emitting element ED is not shaken by the storage capacitor Cst since the drain electrode is electrically connected to the high potential driving voltage VDDEL. Therefore, the current tends to be supplied stably.

For example, the fourth switching transistor T4 and the sixth switching transistor T6 may be connected to the anode electrode of the light emitting element ED. At this time, a constant current can flow regardless of changes in the current and threshold voltage of the light emitting element ED when the switching transistors T4, T6 connected to the light emitting element ED operate in a saturation region. So, reliability is relatively high.

In this subpixel SP structure, the N-type transistors T1 may be oxide transistors formed using a semiconducting oxide (for example, transistors with a channel formed from a semiconducting oxide such as indium, gallium, zinc oxide or IGZO), and other P-type transistors DRT, T2-T6 may be silicon transistors formed from semiconductors such as silicon (for example, transistors with a polysilicon channel formed by low temperature process like LTPS or low temperature polysilicon).

The oxide transistor has a relatively low leakage current than the silicon transistor. Therefore, when it is implemented using the oxide transistor, leakage current from the gate electrode of the driving transistor DRT is reduced, and there is an effect that can reduce the defect of image quality like flicker.

Meanwhile, the remaining P-type transistors DRT, T2-T6 except for the first switching transistor T1 corresponding to the N-type transistor may be made of low temperature polysilicon.

A first scan signal SCAN1 is supplied to the gate electrode of the first switching transistor T1. A drain electrode of the first switching transistor T1 is connected to a gate electrode of the driving transistor DRT. A source electrode of the first switching transistor T1 is connected to a source electrode of the driving transistor DRT.

The first switching transistor T1 is turned on by the first scan signal SCAN1, and controls the operation of the driving transistor DRT using a high potential driving voltage VDDEL stored in the storage capacitor Cst. The high potential driving voltage VDDEL may have a value of 2V to 3V.

The first switching transistor T1 may be formed of an N-type MOS transistor to constitute an oxide transistor. Since the N-type MOS transistor uses electrons as carriers, it has higher mobility and fast switching speed than the P-type MOS transistor.

A second scan signal SCAN2 is supplied to the gate electrode of the second switching transistor T2. Data voltage Vdata may be supplied to the drain electrode of the second switching transistor T2. A source electrode of the second switching transistor T2 is connected to a drain electrode of the driving transistor DRT through a first node Ni.

The second switching transistor T2 is turned on by the second scan signal SCAN2 to supply the data voltage Vdata to the drain electrode of the driving transistor DRT.

An emission signal EM is supplied to the gate electrode of the third switching transistor T3. The high potential driving voltage VDDEL is supplied to a drain electrode of the third switching transistor T3. A source electrode of the third switching transistor T3 is connected to a drain electrode of the driving transistor DRT through the first node Ni.

The third switching transistor T3 is turned on by the emission signal EM to supply the high potential driving voltage VDD to the drain electrode of the driving transistor DRT.

The emission signal EM is supplied to the gate electrode of the fourth switching transistor T4. A drain electrode of the fourth switching transistor T4 is connected to a source electrode of the driving transistor DRT through a third node N3. A source electrode of the fourth switching transistor T4 is connected to an anode electrode of the light emitting element ED through a fourth node N4.

Accordingly, the fourth switching transistor T4 is turned on simultaneously with the third switching transistor T3 by the emission signal EM, and supplies a driving current to the anode electrode of the light emitting element ED.

A third scan signal SCAN3 is supplied to a gate electrode of the fifth switching transistor T5.

A stabilization voltage Vst is supplied to a drain electrode of the fifth switching transistor T5. The stabilization voltage VST may be supplied to the source electrode of the driving transistor DRT in a driving mode at a lower driving frequency, and may be divided into an initialization voltage VINI for initializing the driving transistor DRT, a bias voltage VOBS for reducing hysteresis of the driving transistor DRT, and a leakage suppression voltage VLS for reducing leakage current according to the supplied time.

The initialization voltage VINI may have a value between −6V and −4V, and the bias voltage VOBS may have a value between 5.5V and 7V. Also, the leakage suppression voltage VLS may have a value between 2V and 5V.

A source electrode of the fifth switching transistor T5 is connected to a source electrode of the driving transistor DRT through a third node N3. The fifth switching transistor T5 is turned on by the third scan signal SCAN3 to supply the stabilization voltage VST to the source electrode of the driving transistor DRT.

A fourth scan signal SCAN4 is supplied to a gate electrode of the sixth switching transistor T6.

Here, the fourth scan signal SCAN4 may be the third scan signal SCAN3 supplied to a subpixel SP at another position. For example, when the third scan signal SCAN3 is supplied to nth gate line, the fourth scan signal SCAN4 may be the third scan signal SCAN3 supplied to (n+1)th gate line. That is, the fourth scan signal SCAN4 may be used as the third scan signal SCAN3 at another gate line GL according to a driving phase of the display panel 110.

A reset voltage VAR is supplied to the drain electrode of the sixth switching transistor T6. The source electrode of the sixth switching transistor T6 is connected to the anode electrode of the light emitting element ED through a fourth node N4.

The sixth switching transistor T6 is turned on by the fourth scan signal SCAN4 to supply the reset voltage VAR to the anode electrode of the light emitting element ED.

The gate electrode of the driving transistor DRT is connected to the drain electrode of the first switching transistor T1. The drain electrode of the driving transistor DRT is connected to the source electrode of the second switching transistor T2. The source electrode of the driving transistor DRT is connected to the source electrode of the first switching transistor T1.

The driving transistor DRT is turned on by the voltage difference between the source electrode and the drain electrode of the first switching transistor T1 to supply a driving current to the light emitting element ED.

A high potential driving voltage VDDEL is supplied to one side of the storage capacitor Cst and the other side of the storage capacitor Cst is connected to the gate electrode of the driving transistor DRT. The storage capacitor Cst stores a voltage of the gate electrode of the driving transistor DRT.

The anode electrode of the light emitting element ED is connected to the source electrode of the fourth switching transistor T4 and the source electrode of the sixth switching transistor T6. A low potential driving voltage VSSEL is supplied to a cathode electrode of the light emitting element ED.

The light emitting element ED emits light with a predetermined luminance due to the driving current controlled by the driving transistor DRT.

At this time, the reset voltage VAR is supplied to reset the anode electrode of the light emitting element ED.

When the reset voltage VAR is supplied to the anode electrode of the light emitting element ED in a state that the fourth switching transistor T4 which is located between the anode electrode of the light emitting element ED and the driving transistor DRT is turned off, the anode electrode of the light emitting element ED can be reset.

In order that the driving operation of the driving transistor DRT and the resetting operation of the anode electrode of the light emitting element ED are separately performed, the third scan signal SCAN3 for supplying the stabilization voltage VST and the fourth scan signal SCAN4 for controlling the supply of the reset voltage VAR to the anode electrode of the light emitting element ED may have different phase.

When the switching transistors T5, T6 for supplying the stabilization voltage Vini and the reset voltage VAR are turned on, the fourth switching transistor T4 which connects the source electrode of the driving transistor DRT to the anode electrode of the light emitting element ED may be turned off. As a result, the driving current of the driving transistor DRT is blocked so as not to flow to the anode electrode of the light emitting element ED, so that the anode electrode is not affected by voltages other than the reset voltage VAR.

As described above, the subpixel SP including the seven transistors DRT, T1, T2, T3, T4, T5, T6 and one capacitor Cst may be referred to as a 7T1C structure.

Here, the 7T1C structure is shown as an example among various type of subpixel SP circuits. The structure and number of transistors and capacitors constituting the subpixel SP may be variously changed. Meanwhile, each of the plurality of subpixels SP may have the same structure, or some of the plurality of subpixels SP may have different structures.

At this time, since the bias voltage VOBS supplied to the source electrode of the driving transistor DRT in a bias period has a relatively high level, the leakage current may be occurred even if the third switching transistor T3 is turned off.

This leakage current may cause a emission error such as black glare by operating the light emitting element ED even in a state in which the third switching transistor T3 is turned off.

Accordingly, the display device 100 of the present disclosure may reduce the degradation of image quality due to leakage current by supplying the leakage suppression voltage VLS of a lower level than the bias voltage VOBS after the bias period so that the emission error may not be occurred in the emission period after the bias period.

Figure 6:
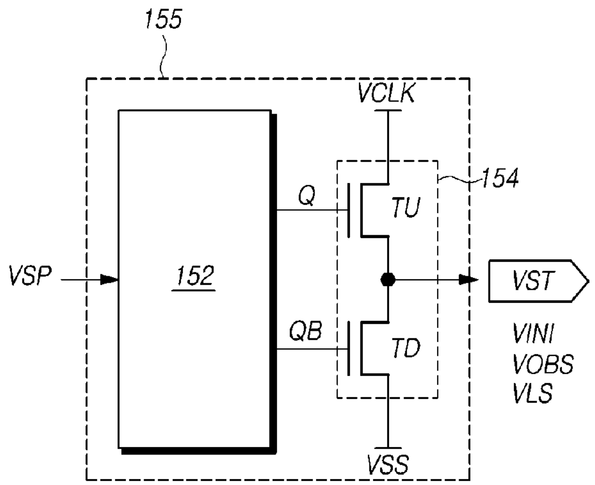
FIG. 6 illustrates a schematic block diagram of a stabilization voltage generating circuit in a display device according to the present disclosure.

FIG. 6 illustrates a schematic block diagram of a stabilization voltage generating circuit in a display device according to an aspect of the present disclosure.

Referring to FIG. 6, the stabilization voltage generating circuit 155 may include a shift register 152 and a buffer circuit 154 in the display device 100 according to aspects of the present disclosure.

The stabilization voltage generating circuit 155 operates according to a stabilization start pulse VSP and generates the stabilization voltage VST according to a stabilization clock VCLK. The stabilization voltage VST generated from the stabilization voltage generating circuit 155 are sequentially shifted and sequentially supplied through the fifth switching transistor T5.

The buffer circuit 154 may have two nodes Q, QB that are important for a driving state, and may include a pull-up transistor TU and a pull-down transistor TD. Here, a gate electrode of the pull-up transistor TU may correspond to the Q node, and a gate electrode of the pull-down transistor TD may correspond to the QB node.

The shift register 152 may be referred to as a shift logic circuit, and may be used to generate the stabilization voltage VST in synchronization with the stabilization clock VCLK.

The shift register 152 may include a plurality of transistors and control the gate electrode of the pull-up transistor TU and the gate electrode of the pull-down transistor TD constituting the buffer circuit 154 so that the buffer circuit 124 may generate the stabilization voltage VST.

The shift register 152 sequentially turns on the output according to the stabilization clock VCLK. That is, the stabilization voltage VST with a predetermined level may be sequentially supplied to the buffer circuit 154 by controlling the output time of the shift register 152 using the stabilization gate clock VCLK.

Each voltage state of the gate electrode of the pull-up transistor TU and the gate electrode of the pull-down transistor TD constituting the buffer circuit 154 may be changed by the shift register 152. Accordingly, the buffer circuit 154 may supply the initialization voltage VINI for initializing a driving transistor DRT, the bias voltage VOBS for reducing the hysteresis of a driving transistor DRT, and the leakage suppression voltage VLS for reducing the leakage current.

Meanwhile, a stabilization voltage generating circuit 155 may further include a level shifter in addition to the shift register 152 and the buffer circuit 154.

In this case, the shift register 152 and the buffer circuit 154 constituting the stabilization voltage generating circuit 155 may be connected in various structures.

Figure 7:
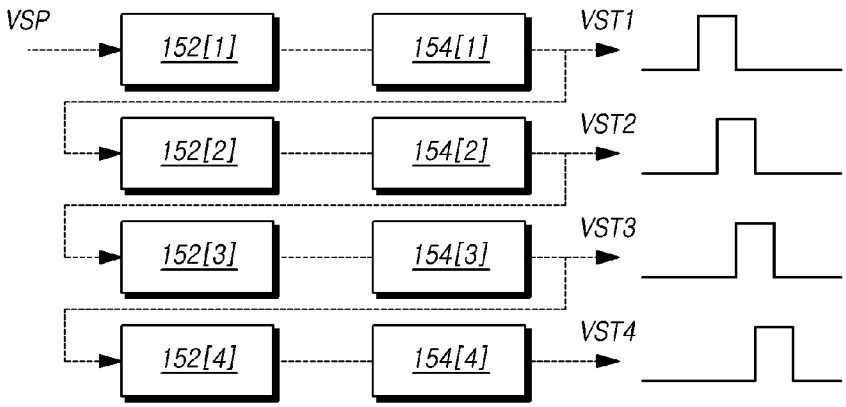
FIG. 7 illustrates an exemplary diagram of a relationship of a stabilizing voltage generating circuits in a display device according to the present disclosure.

FIG. 7 illustrates an exemplary diagram of a relationship of a stabilizing voltage generating circuits in a display device according to an aspect of the present disclosure.

Referring to FIG. 7, the shift register 152 constituting the stabilization voltage generating circuit 155 in the display device 100 according to an aspect of the present disclosure may be configured to correspond to a plurality of buffer circuits 154. Otherwise, a plurality of buffer circuits 154 may be configured to correspond to one shift register 152.

Here, it illustrates an exemplary case that the plurality of shift registers 152[1]-152[4] constituting the stabilization voltage generating circuit 155 are connected to the plurality of buffer circuits 154[1]-154[4] in a form of 1:1.

The first shift register 152[1] of the stabilization voltage generating circuit 155 starts an operation by the stabilization start pulse VSP, and the second shift register 152[2] to the fourth shift register 152[4] may use a carry signal transmitted from the shift register of the previous stage as a stabilization start pulse VSP.

At this time, the carry signal used as the stabilization start pulse VSP may be a signal of the gate electrode of the pull-up transistor TU or the gate electrode of the pull-down transistor TD in the previous stage. Or, it may be a stabilization voltage VST generated from the buffer circuit 154. Here, it illustrates a case where the stabilization voltage VST of the previous stage is used as the stabilization start pulse VSP.

For example, the first shift register 152[1] starts an operation by the first stabilization start pulse VSP, and the second shift register 152[2] to the fourth shift register 152[4] may be cascaded to generate stabilization voltages VST2-VST4 by using the stabilization voltages VST1-VST3 of the previous stage as carry signals.

Meanwhile, the initialization voltage VINI may have a negative voltage level, while the bias voltage VOBS and the leakage suppression voltage VLS may have a positive voltage level in the display device 100 of the present disclosure.

Accordingly, the stabilization voltage generating circuit 155 may transmit the initialization voltage VINI with a negative voltage level through the first output terminal, and may transmit the bias voltage VOBS and the leakage suppression voltage VLS with a positive voltage level through the second output terminal.

In this case, the output timing of the bias voltage VOBS and the leakage suppression voltage VLS may be controlled through a switching circuit connected to the second output terminal to which the bias voltage VOBS and the leakage suppression voltage VLS are supplied.

Figure 8:
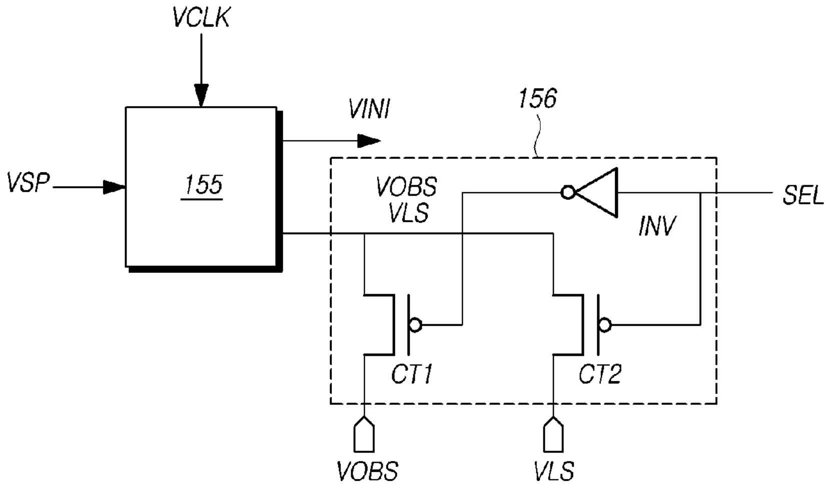
FIG. 8 illustrates a diagram of a switching circuit for controlling output timing of a bias voltage and a leakage suppression voltage in a display device according to the present disclosure.

FIG. 8 illustrates a diagram of a switching circuit for controlling output timing of a bias voltage and a leakage suppression voltage in a display device according to an aspect of the present disclosure.

Referring to FIG. 8, the stabilization voltage generating circuit 155 in the display device 100 according to an aspect of the present disclosure may include a first output terminal for generating an initialization voltage VINI and a second output terminal for generating a bias voltage VOBS, and a leakage suppression voltage VLS.

The second output terminal may be connected to the switching circuit 156 for transmitting the bias voltage VOBS or the leakage suppression voltage VLS to the subpixel SP by the selection signal SEL.

The switching circuit 156 may include a first control transistor CT1 and a second control transistor CT2 respectively having a drain electrode connected to the second output terminal of the stabilizing voltage generating circuit 155, and an inverter INV which receives a selection signal SEL and has an output terminal connected to the gate electrode of the first control transistor CT1 and an input terminal connected to the gate electrode of the second control transistor CT2.

Accordingly, the phase of a signal supplied to the gate electrode of the first control transistor CT1 is opposite to the signal supplied to the gate electrode of the second control transistor CT2. That is, the first control transistor CT1 and the second control transistor CT2 are alternately driven in which one is turned on and the other is turned off by the selection signal SEL supplied to the inverter INV.

As a result, only one of the bias voltage VOBS or the leakage suppression voltage VLS generated from the second output terminal of the stabilization voltage generating circuit 155 is supplied to the subpixel SP by the selection signal SEL. The selection signal SEL may be supplied from the timing controller 140.

Accordingly, the display device 100 of the present disclosure may determine the time at which the initialization voltage VINI is supplied to the subpixel SP by the stabilizing voltage generating circuit 155 and the time at which the bias voltage VOBS or the leakage suppression voltage VLS is supplied to the subpixel SP by the timing controller 140.

The stabilization voltage generating circuit 155 may be included in the power management circuit 150. Alternatively, it may be included in a driving circuit such as the gate driving circuit 120 or the data driving circuit 130.

Figure 9:
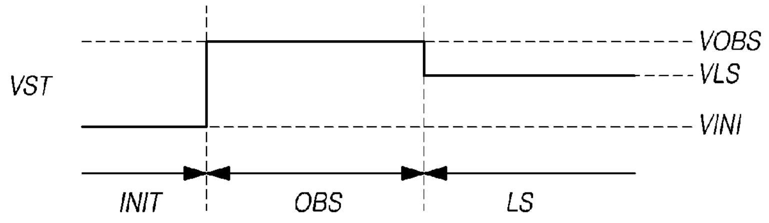
FIG. 9 is a signal waveform illustrating levels of an initialization voltage, a bias voltage, and a leakage suppression voltage constituting a stabilization voltage in a display device according to the present disclosure.

FIG. 9 is a signal waveform illustrating levels of an initialization voltage, a bias voltage, and a leakage suppression voltage constituting a stabilization voltage in a display device according to an aspect of the present disclosure.

Referring to FIG. 9, the display device 100 according to an aspect of the present disclosure may supply the stabilization voltage VST with different levels over time to the driving transistor DRT constituting the subpixel SP in the second mode Mode2 driven at a lower driving frequency.

For example, an initialization voltage VINI with a negative level may be supplied during an initialization period INIT for initializing the driving transistor DRT, and a bias voltage VOBS with a first positive level may be supplied during a bias period OBS for reducing hysteresis of the driving transistor DRT. In addition, the leakage suppression voltage VLS with a second positive level may be supplied during a leakage suppression period LS including the emission period EMISSION in which the light emitting element ED emits light.

The leakage suppression period LS supplying the leakage suppression voltage VLS may be located between the second bias period OBS2 of the refresh frame and the third bias period OBS3 of the skip frame to reduce the leakage current caused by the bias voltage VOBS.

In this case, the initialization period INIT supplying the initialization voltage VINI to the driving transistor DRT may be included in a refresh frame supplying the data voltage Vdata to the subpixel SP.

Also, the bias period OBS supplying the bias voltage VOBS to the driving transistor DRT may be included only in a skip frame not supplying the image data DATA to the subpixel SP. Otherwise, it may be included in both a refresh frame period supplying the image data DATA to the subpixel SP and a skip frame not supplying the image data DATA to the subpixel SP.

The bias voltage VOBS for reducing the hysteresis of the driving transistor DRT may have a relatively high level, and the leakage suppression voltage VLS may have a lower level than the bias voltage VOBS since the leakage suppression voltage VLS is a voltage for suppressing the leakage current.

Figure 10:
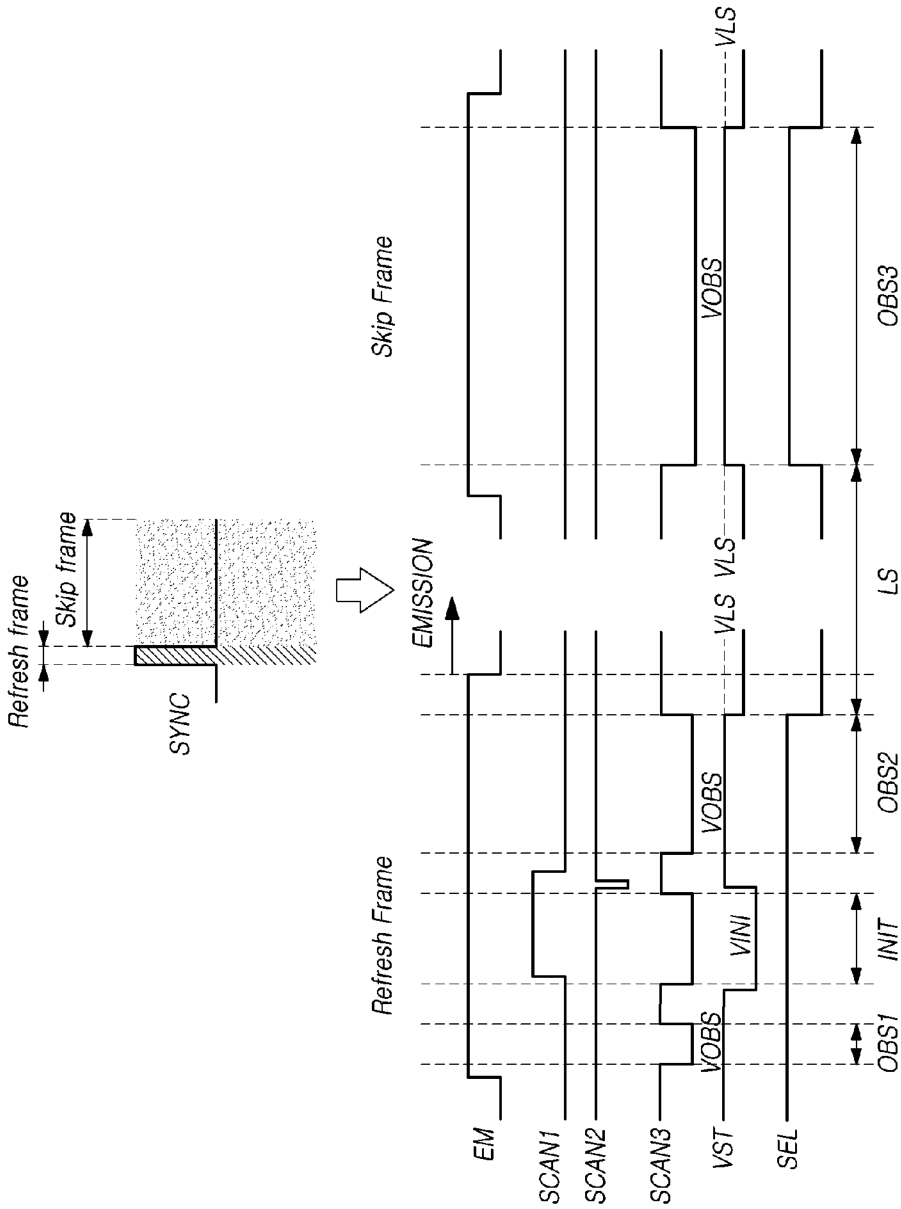
FIG. 10 illustrates a driving timing in a second mode driven at a lower driving frequency in the display device according to the present disclosure.

FIG. 10 illustrates a driving timing in a second mode driven at a lower driving frequency in the display device according to an aspect of the present disclosure.

Referring to FIG. 10, the second mode Mode2 driven at a lower driving frequency in the display device 100 according to an aspect of the present disclosure may include a first frame period and a second frame period which are divided from one frame period based on a synchronization signal SYNC.

The first frame period may be a refresh frame in which image data DATA are displayed, and the second frame period may be a skip frame in which image data DATA are not transmitted.

A data voltage Vdata for driving the subpixel SP, a initialization voltage VINI, and a reset voltage VAR may be supplied at the refresh frame.

A refresh frame is a period for initializing the voltage charged or remaining in the storage capacitor Cst and the driving transistor DRT. A refresh frame may be partially provided in the start period of each frame in the second mode Mode2 driven at a low speed. Effects of the data voltage Vdata and the driving voltage stored in the subpixel SP in the first mode Mode1 driven at a high speed may be removed in the refresh frame.

After the refresh operation is completed within the refresh frame, the light emitting element ED may emit light according to the data voltage Vdata supplied to the subpixel SP.

Meanwhile, a sampling process for compensating for a characteristic value (threshold voltage or mobility) of the driving transistor DRT may be performed within the refresh frame.

For example, when the first switching transistor T1 is turned on by the first scan signal SCAN1 to electrically connect the gate electrode and the source electrode of the driving transistor DRT, the gate electrode and the source electrode of the driving transistor DRT have substantially equal potentials.

At this time, when the second switching transistor T2 is turned on by the second scan signal SCAN2 to supply the data voltage Vdata, it forms a current path until the voltage difference Vgs between the gate electrode and the source electrode of the driving transistor DRT reaches the threshold voltage of the driving transistor DRT. Accordingly, the voltages difference between the gate electrode and the source electrode of the driving transistor DRT are increased.

That is, when the data voltage Vdata is supplied to the drain electrode of the driving transistor DRT, the voltages difference between the gate electrode and the source electrode of the driving transistor DRT rise to a voltage difference between the data voltage and the threshold voltage. Due to this, the threshold voltage of the driving transistor DRT may be compensated.

As described above, the process of compensating for the characteristic value of the driving transistor DRT by the sampling process may correspond to internal compensation.

Meanwhile, in order to reduce a hysteresis effect that may occur in the driving transistor DRT and improve response characteristic, a bias voltage VOBS may be supplied during the refresh frame.

For example, the driving transistor DRT may be in an on-bias state through which a large current flows between the drain electrode and the source electrode of the driving transistor DRT by supplying a peak white grayscale voltage to the gate electrode of the driving transistor DRT.

On the other hand, the driving transistor DRT may be in an off-bias state through which no current flows between the drain electrode and the source electrode of the driving transistor DRT by supplying a peak black grayscale voltage to the gate electrode of the driving transistor DRT.

The peak white grayscale voltage refers to a voltage supplied to the gate electrode of the driving transistor DRT to emit the light emitting element ED with a peak white grayscale, and the peak black grayscale voltage refers to a voltage supplied to the gate electrode of the driving transistor DRT to emit the light emitting element ED with a peak black grayscale. For example, when a grayscale value is expressed as an 8-bit digital value, the peak black grayscale may mean minimum value "0", and the peak white grayscale may mean maximum value "255".

At this time, since the sweep curves of the on-bias state and the off-bias state in the P-type driving transistor DRT are not same, a current flowing between the drain electrode and the source electrode of the driving transistor DRT in the same grayscale may be different.

At this time, in the gray expression, the current characteristic flowing between the drain electrode and the source electrode of the driving transistor DRT is changed between the on-bias state and the off-bias state due to the voltage deviation between the gate electrode and the source electrode of the driving transistor DRT. Such phenomenon is called a hysteresis, which may cause an afterimage.

In addition, the difference of driving current flowing through the drain electrode and the source electrode of the driving transistor DRT does not stabilize the driving characteristics of the light emitting element ED, and may cause a luminance deviation.

In particular, when an operation mode of the display device 100 is changed from the first mode Mode1 driven at a higher driving frequency to the second mode Mode2 driven at a lower driving frequency, the afterimage due to the hysteresis phenomenon can be generated.

Accordingly, while the display device 100 operates in the second mode Mode2 driven at the lower driving frequency, a first bias period OBS1 and a second bias period OBS2 for setting the driving transistor DRT to an on-bias state may be performed before the emission period EMISSION due to the emission signal EM of low logic level L starts in order to minimize an afterimage due to the hysteresis phenomenon.

The bias period OBS1, OBS2 may proceed only once or may proceed two or more times within the refresh frame.

For the purpose of above, the driving transistor DRT may be set to an on-bias state by supplying the bias voltage VOBS with the first positive level to the source electrode of the driving transistor DRT before the emission period EMISSION starts.

For example, the bias voltage VOBS may be supplied to the source electrode of the driving transistor DRT before the emission period EMISSION starts within a refresh frame of the second mode Mode2 operated at a lower driving frequency.

At this time, when the emission signal EM is converted to a low logic level while the bias voltage VOBS is supplied to the source electrode of the driving transistor DRT, the bias voltage VOBS with the first positive level may cause leakage current to flow in the light emitting element ED.

As a result, the voltage level of the anode electrode of the light emitting element ED gets higher than the turn-on level of the light emitting element ED, so that a black glare phenomenon or a luminance deviation appears.

In order to improve this problem, a period of the bias period OBS in which two ends of the emission period EMISSION are included may be set as the leakage suppression period LS, and the leakage suppression voltage VLS with a second positive level for reducing the leakage current may be supplied to the driving transistor DRT during the leakage suppression period LS.

The leakage suppression period LS may include a period from the time when the bias period OBS2 before the emission period EMISSION ends in the refresh frame to the time when the emission period EMISSION ends in the skip frame.

The second positive level of the leakage suppression voltage VLS is for reducing the leakage current flowing in the light emitting element ED in the emission period EMISSION, and may be a value lower than the first positive level of the bias voltage VOBS.

The skip frame is a period for charging or setting the data voltage Vdata and the driving voltage of each frame. The skip frame continues until the next refresh frame starts after the refresh frame is completed in each frame.

In the skip frame, the anode electrode of the light emitting element ED may be reset to the reset voltage VAR. In this case, the anode electrode of the light emitting element ED may be reset to a predetermined voltage in order to improve flicker generated while the driving of the skip frame is extended due to the skip frame driven at a lower driving frequency.

Specifically, the data voltage Vdata in the skip frame maintains a low logic level L.

In addition, a third bias period OBS3 in which a bias voltage VOBS is supplied during a skip frame may proceed in order to degraded a hysteresis effect that may occur in the driving transistor DRT and improve response characteristics.

That is, when the display device 100 operates in the second mode Mode2 operated at a lower driving frequency, the third bias period OBS3 for setting the driving transistor DRT to an on-bias state may proceed in a skip frame in order to minimize the recognition of an afterimage due to a hysteresis phenomenon.

As described above, the display device 100 of the present disclosure may reduce degradation of image quality due to leakage current by supplying the leakage suppression voltage VLS with a lower level than the bias voltage VOBS during the leakage suppression period LS including the emission period EMISSION in order to suppress an emission error due to leakage current in the emission period EMISSION after the bias period OBS2 of the refresh frame.

Meanwhile, the display device 100 of the present disclosure may determine a first positive level of the bias voltage VOBS and a second positive level of the leakage suppression voltage VLS by reflecting the grayscale of the image data DATA supplied during the refresh frame.

Figure 11:
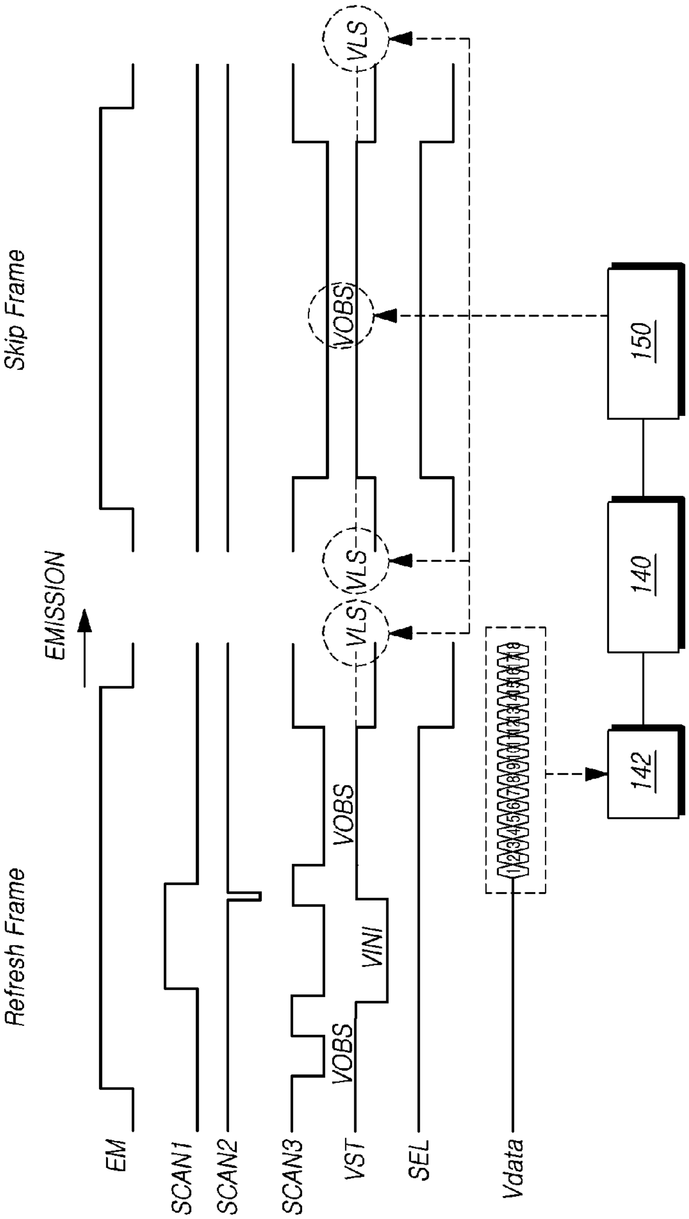
FIG. 11 illustrates an exemplary diagram of a driving timing for determining levels of a bias voltage and a leakage suppression voltage depending on image data transmitted in a refresh frame in a display device according to the present disclosure.

FIG. 11 illustrates an exemplary diagram of a driving timing for determining levels of a bias voltage and a leakage suppression voltage depending on image data transmitted in a refresh frame in a display device according to an aspect of the present disclosure.

Referring to FIG. 11, the display device 100 according to an aspect of the present disclosure may control the levels of the leakage suppression voltage VLS supplied in the leakage suppression period LS and the bias voltage VOBS supplied in the bias period OBS3 of the skip frame depending on the image data DATA supplied to the display panel 110 or the data voltage Vdata supplied to the display panel 110 through the data line DL in the refresh frame when the first mode Mode1 driven at a higher driving frequency was changed to the second mode Mode2 driven at a lower driving frequency.

For the purpose of above, the image data DATA supplied to the display panel 110 in the refresh frame may be temporarily stored in the memory 142. In this case, the memory 142 storing the image data DATA may be disposed on the control printed circuit board CPCB together with the timing controller 140 or disposed outside the control printed circuit board CPCB.

Accordingly, the timing controller 140 may determine in advance the grayscale of the image data DATA to be supplied from the memory 142 in the refresh frame. Also, it may control the level of the leakage suppression voltage VLS supplied in the leakage suppression period LS and the bias voltage VOBS supplied in the bias period OBS3 of the skip frame according to the grayscale of the image data DATA supplied in the refresh frame.

The power management circuit 150 may supply the leakage suppression voltage VLS and the bias voltage VOBS corresponding to the grayscale of the image data DATA supplied in the refresh frame to the source electrode of the driving transistor DRT depending on the control of the timing controller 140.

For example, when the image data DATA supplied in the refresh frame has a low grayscale level, an image defect is less likely to be recognized by the user since the display panel 110 displays an image close to black color. On the other hand, when the image data DATA supplied in the refresh frame has a high grayscale level, even minor image defect is more likely to be recognized by the user since the display panel 110 displays an image close to white color.

Considering these characteristics, the leakage suppression voltage VLS and the bias voltage VOBS may be determined to high levels when the image data DATA supplied in the refresh frame has a low grayscale level, and the leakage suppression voltage VLS and the bias voltage VOBS may be determined to low levels when the image data DATA supplied in the refresh frame has a high grayscale level, so that the image defect recognized by the user may be reduced.

Figure 12:
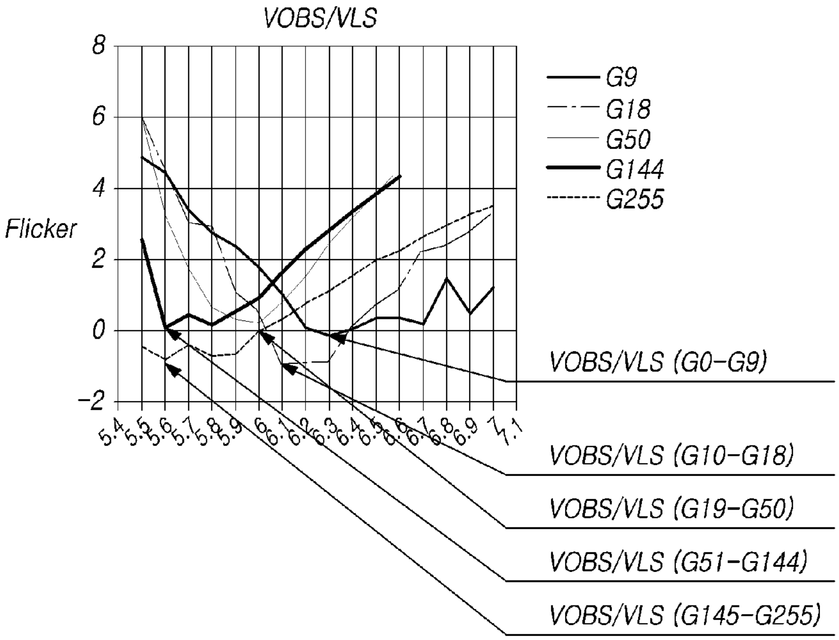
FIG. 12 illustrates an exemplary case that image data supplied in the refresh frame is classified into a plurality of grayscales, and a leakage suppression voltage and a bias voltage are determined differently depending on the grayscales of the image data in the display device according to the present disclosure.

FIG. 12 illustrates an exemplary case that image data supplied in the refresh frame is classified into a plurality of grayscales, and a leakage suppression voltage and a bias voltage are determined differently depending on the grayscales of the image data in the display device according to an aspect of the present disclosure.

Referring to FIG. 12, the display device 100 according to an aspect of the present disclosure may differently determine the leakage suppression voltage VLS and the bias voltage VOBS capable of reducing image defects depending on the grayscales of the image data DATA.

In this case, the leakage suppression voltage VLS supplied in the leakage suppression period LS and the bias voltage VOBS supplied in the bias period OBS may determine the voltage with the least image defect for each grayscale of the image data DATA as an optimal level.

For example, the leakage suppression voltage VLS and the bias voltage VOBS capable of minimizing the image defect when the image data DATA supplied in the refresh frame has 9 grayscale G9 may be determined to a level VLS/VOBS(G0-G9) of a range between 0 grayscale G0 and 9 grayscale G9. Also, the leakage suppression voltage VLS and bias voltage VOBS capable of minimizing the image defect when the image data DATA supplied in the refresh frame has 18 grayscale G18 may be determined to a level VLS/VOBS(G10-G18) of a range between 10 grayscale G10 and 18 grayscale G18.

In addition, the leakage suppression voltage VLS and the bias voltage VOBS capable of minimizing the image defect when the image data DATA supplied in the refresh frame has 50 grayscale G50 may be determined to a level VLS/VOBS (G19-G50) of a range between 19 grayscale G19 and 50 grayscale G50. Also, the leakage suppression voltage VLS and bias voltage VOBS capable of minimizing the image defect when the image data DATA supplied in the refresh frame has 144 grayscale G144 may be determined to a level VLS/VOBS(G51-G144) of a range between 51 grayscale G51 and 144 grayscale G144.

In addition, the leakage suppression voltage VLS and bias voltage VOBS capable of minimizing the image defect when the image data DATA supplied in the refresh frame has 255 grayscale G255 may be determined to a level VLS/VOBS (G145-G255) of a range between 145 grayscale G145 and 255 grayscale G255.

The leakage suppression voltage VLS and the bias voltage VOBS corresponding to the grayscale level of the image data DATA mentioned above are illustrated as examples, and the grayscale level of the image data DATA for determining the levels of the leakage suppression voltage VLS and the bias voltage VOBS may be variously changed.

As described above, the image defect phenomenon recognized by the user may be effectively degraded by classifying the grayscales of the image data DATA supplied in the refresh frame into a plurality of ranges and determining the leakage suppression voltage VLS and the bias voltage VOBS as the optimal level depending on the ranges of each grayscale with the least image defect.

Figure 13:
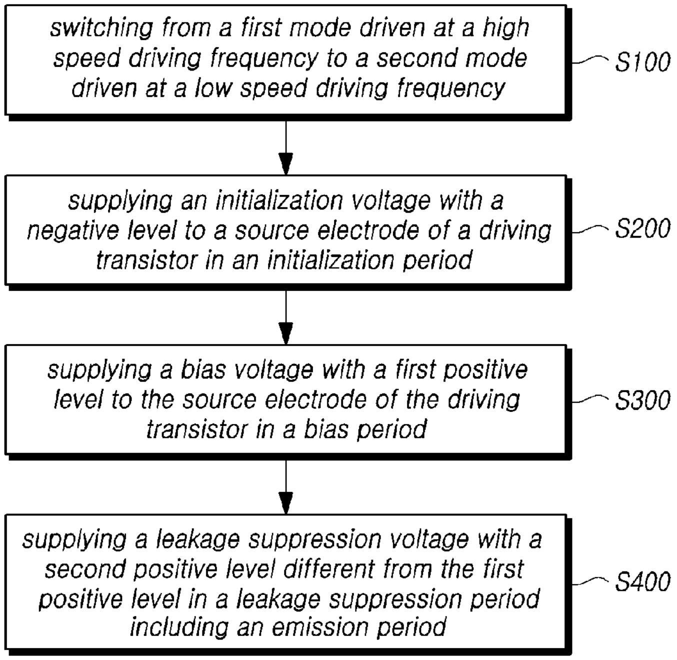
FIG. 13 illustrates a flowchart of a display driving method according to the present disclosure.

FIG. 13 illustrates a flowchart of a display driving method according to an aspect of the present disclosure.

Referring to FIG. 13, the display driving method according to an aspect of the present disclosure may include a step S100 of switching from a first mode driven at a higher driving frequency to a second mode driven at a lower driving frequency, a step S200 of supplying an initialization voltage VINI with a negative level to a source electrode of a driving transistor DRT in an initialization period INIT, a step S300 of supplying a bias voltage VOBS with a first positive level to the source electrode of the driving transistor DRT in a bias period OBS, and a step S400 of supplying a leakage suppression voltage VLS with a second positive level different from the first positive level in a leakage suppression period LS including an emission period EMISSION.

The step S100 of switching from a first mode driven at a higher driving frequency to a second mode driven at a lower driving frequency is a period which is operated to display a still image or a low speed image, and a predetermined image may be displayed on the display panel 110 during the refresh frame of the second mode and an image may not be displayed on the display panel 110 during the remaining skip frame.

The step S200 of supplying an initialization voltage VINI with a negative level to a source electrode of a driving transistor DRT in an initialization period INIT is a process of supplying the initialization voltage VINI for initializing the driving transistor DRT in the refresh frame in which the data voltage Vdata is supplied to the subpixel SP.

The step S300 of supplying a bias voltage VOBS with a first positive level to the source electrode of the driving transistor DRT in a bias period OBS is a process of setting the driving transistor DRT to an on-bias state before the light emitting element ED emits light in order to minimize an afterimage due to a hysteresis phenomenon when the display device 100 is operated in the second mode driven at the lower driving frequency.

The process of setting the driving transistor DRT to the on-bias state may be performed in a refresh frame or a skip frame, and may be performed only once, respectively, or may be performed two or more times.

The step S400 of supplying a leakage suppression voltage VLS with a second positive level different from the first positive level in a leakage suppression period LS including an emission period EMISSION is a process of supplying the leakage suppression voltage VLS with a level lower than the bias voltage VOBS to the source electrode of the driving transistor DRT in order to reduce the leakage current flowing through the light emitting element ED in the emission period EMISSION.

Through the display driving method, the display device 100 of the present disclosure may reduce the degradation of image quality due to leakage current by supplying the leakage suppression voltage VLS of a level lower than the bias voltage VOBS in the leakage suppression period LS including the emission period EMISSION in order to reduce an emission error occurred in the emission period EMISSION due to leakage current after the bias period OBS of the refresh frame.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:

1. A display device comprising:

a display panel including a light emitting element, a driving transistor providing a driving current to the light emitting element using a driving voltage, and a plurality of switching transistors configured to control the operation of the driving transistor;

a gate driving circuit configured to supply a plurality of scan signals to the display panel through a plurality of gate lines;

an emission driving circuit configured to supply a plurality of emission signals to the display panel through a plurality of emission signal lines;

a data driving circuit configured to supply a data voltage to the display panel; and a timing controller configured to control a leakage suppression voltage to be supplied to the driving transistor in a leakage suppression period after a bias voltage is supplied to the driving transistor in a low speed mode in which the display panel is driven at a lower driving frequency, wherein the low speed mode includes:

a refresh frame in which the data voltage configured to drive the light emitting element is supplied; and a skip frame in which the data voltage is not supplied, wherein the leakage suppression period includes the emission period in which the light emitting element emits light between the refresh frame and the skip frame.

2. The display device according to claim 1, wherein the plurality of switching transistors include:

a first switching transistor to which a first scan signal is supplied to a gate electrode, a drain electrode is connected to a gate electrode of the driving transistor and a storage capacitor, and a source electrode is connected to a source electrode of the driving transistor;

a second switching transistor to which a second scan signal is supplied to a gate electrode, the data voltage is supplied to a drain electrode, and a source electrode is connected to a drain electrode of the driving transistor;

a third switching transistor to which the emission signal is supplied to the gate electrode, the driving voltage is supplied to the drain electrode, and the source electrode is connected to the drain electrode of the driving transistor;

a fourth switching transistor to which the emission signal is supplied to a gate electrode, the driving voltage is supplied to a drain electrode, and a source electrode is connected to an anode electrode of the light emitting element;

a fifth switching transistor to which a third scan signal is supplied to a gate electrode, a stabilization voltage is supplied to a drain electrode, and a source electrode is connected to the source electrode of the driving transistor; and a sixth switching transistor to which a fourth scan signal is supplied to a gate electrode, a reset voltage is supplied to a drain electrode, and a source electrode is connected to the anode electrode of the light emitting element.

3. The display device according to claim 2, wherein the stabilization voltage includes an initialization voltage for initializing the driving transistor, the bias voltage, and the leakage suppression voltage.

4. The display device according to claim 3, wherein the initialization voltage is supplied in the refresh frame, the bias voltage is supplied in the refresh frame or in the skip frame, and the leakage suppression voltage is supplied during the leakage suppression period.

5. The display device according to claim 4, wherein the initialization voltage has a negative level, the bias voltage has a first positive level, and the leakage suppression voltage has a second positive level lower than the first positive level.

6. The display device according to claim 1 further comprising a memory for storing the image data supplied to the display panel, wherein the timing controller controls levels of the leakage suppression voltage and the bias voltage depending on a grayscale of the image data supplied from the memory in the refresh frame.

7. A driving circuit of a display panel including a light emitting element, a driving transistor providing a driving current to the light emitting element using a driving voltage, and a plurality of switching transistors for controlling the operation of the driving transistor, the driving circuit comprising:

a shift register configured to generate a first output signal through a first node and a second output signal through a second node depending on a stabilization start pulse;

a buffer circuit configured to transmit an initialization voltage to a first output terminal, and a bias voltage and a leakage suppression voltage to a second output terminal depending on the first output signal and the second output signal; and a switching circuit configured to supply the bias voltage or the leakage suppression voltage to a source electrode of the driving transistor depending on a selection signal.

8. The driving circuit according to claim 7, wherein the switching circuit includes:

a first control transistor and a second control transistor each having a drain electrode connected to the second output terminal;

an inverter which receives the selection signal, an output terminal is connected to a gate electrode of the first control transistor; and an input terminal connected to a gate electrode of the second control transistor.

9. The driving circuit according to claim 7, wherein the initialization voltage is supplied in a refresh frame to which a data voltage for driving the light emitting element is applied in a low speed mode driven at a lower driving frequency, the bias voltage is supplied in the refresh frame, or a skip frame in which the data voltage is not supplied, in the low speed mode driven at the lower driving frequency, and the leakage suppression voltage is supplied in a leakage suppression period including an emission period in which the light emitting element emits light between the refresh frame and the skip frame.

10. The driving circuit according to claim 9, wherein levels of the leakage suppression voltage and the bias voltage are determined depending on a grayscale of the image data supplied in the refresh frame.

11. The driving circuit according to claim 7, wherein the initialization voltage has a negative level, the bias voltage has a first positive level, and the leakage suppression voltage has a second positive level lower than the first positive level.

12. A display driving method of a display panel including a light emitting element, a driving transistor providing a driving current to the light emitting element using a driving voltage, and a plurality of switching transistors controlling the operation of the driving transistor, comprising:

switching from a first mode driven at a higher driving frequency to a second mode driven at a lower driving frequency;

supplying an initialization voltage with a negative level to a driving transistor in an initialization period;

supplying a bias voltage with a first positive level to the driving transistor in a bias period; and supplying a leakage suppression voltage with a second positive level different from the first positive level to the driving transistor in a leakage suppression period including an emission period.

13. The display driving method according to claim 12, wherein the second mode includes:

a refresh frame in which the data voltage driving the light emitting element is supplied; and a skip frame in which the data voltage is not supplied, wherein the leakage suppression period includes the emission period in which the light emitting element emits light between the refresh frame and the skip frame.

14. The display driving method according to claim 13, wherein the initialization voltage is supplied in the refresh frame, the bias voltage is supplied in the refresh frame or in the skip frame, and the leakage suppression voltage is supplied in the leakage suppression period.

15. The display driving method according to claim 14, wherein levels of the leakage suppression voltage and the bias voltage are determined depending on a grayscale of the image data supplied in the refresh frame.

16. The display driving method according to claim 12, wherein the second positive level is lower than the first positive level.

* * * * *